United States Patent
Yoon et al.

(10) Patent No.: US 9,306,767 B2
(45) Date of Patent: Apr. 5, 2016

(54) EXPANDABLE ETHERNET RING TOPOLOGY NETWORK AND COMMUNICATION METHOD THEREOF

(71) Applicant: LSIS CO., LTD., Anyang-si, Gyeonggi-do (KR)

(72) Inventors: Geon Yoon, Uiwang-si (KR); Joon Seok Oh, Gunpo-si (KR)

(73) Assignee: LSIS CO., LTD., Anyang-si (KR)

( * ) Notice: Subject to any disclaimer, the term of this patent is extended or adjusted under 35 U.S.C. 154(b) by 54 days.

(21) Appl. No.: 14/012,493

(22) Filed: Aug. 28, 2013

(65) Prior Publication Data

US 2014/0126578 A1    May 8, 2014

(30) Foreign Application Priority Data

Nov. 2, 2012    (KR) ......................... 10-2012-0123326

(51) Int. Cl.
| | |
|---|---|
| *H04L 12/54* | (2013.01) |
| *H04L 12/46* | (2006.01) |
| *H04L 12/42* | (2006.01) |

(52) U.S. Cl.
CPC ............ *H04L 12/4637* (2013.01); *H04L 12/42* (2013.01); *H04L 12/4625* (2013.01)

(58) Field of Classification Search
CPC .................................................. H04L 12/4737
USPC ......................................................... 370/404
See application file for complete search history.

(56) References Cited

U.S. PATENT DOCUMENTS

| | | | |
|---|---|---|---|
| 2009/0268746 A1* | 10/2009 | Ogasahara et al. | 370/406 |
| 2012/0099425 A1* | 4/2012 | Wang et al. | 370/225 |

FOREIGN PATENT DOCUMENTS

| | | |
|---|---|---|
| EP | 2182679 | 5/2010 |
| JP | 2007-159136 | 6/2007 |
| JP | 2008-092542 | 4/2008 |
| JP | 2008-236652 | 10/2008 |
| JP | 2011-061652 | 3/2011 |
| JP | 2011-160427 | 8/2011 |
| JP | 2011-188414 | 9/2011 |
| JP | 2011-239382 | 11/2011 |
| WO | 2007/077998 | 7/2007 |

OTHER PUBLICATIONS

European Patent Office Application Serial No. 13182376.7, Search Report dated Dec. 17, 2013, 6 pages.
Japan Patent Office Application Serial No. 2013-199804, Office Action dated Nov. 10, 2014, 3 pages.
(Continued)

*Primary Examiner* — Samina Choudhry
(74) *Attorney, Agent, or Firm* — Lee Hong Degerman Kang & Waimey; Jonathan Kang; Jeffrey Lotspeich

(57) ABSTRACT

The present invention connects a ring topology Ethernet network to other networks of various shapes. To that end, a first ring topology network configured in a ring shape has three or more expandable nodes (each have three or more Ethernet ports), and is connected to other networks through Ethernet ports that are not used for the formation of the first ring topology network among Ethernet ports of the expandable node. Thus, it is possible to add equipment without changing a ring topology network previously built and it is possible to integrate and manage networks of various shapes into a single network.

6 Claims, 7 Drawing Sheets

(56) References Cited

OTHER PUBLICATIONS

Koguchi, et al., "A Study on Ethernet multi-ring protection mechanism by Ethernet OAM," The Institute of Electronics, Information and Communication Engineers, IEICE Technical Report CS2006-88, Jan. 2007, pp. 103-108.

Japan Patent Office Application Serial No. 2013-199804, Office Action dated May 19, 2015, 3 pages.

* cited by examiner

*Port #1, Port #2 : OPERATE AS RING PORTS

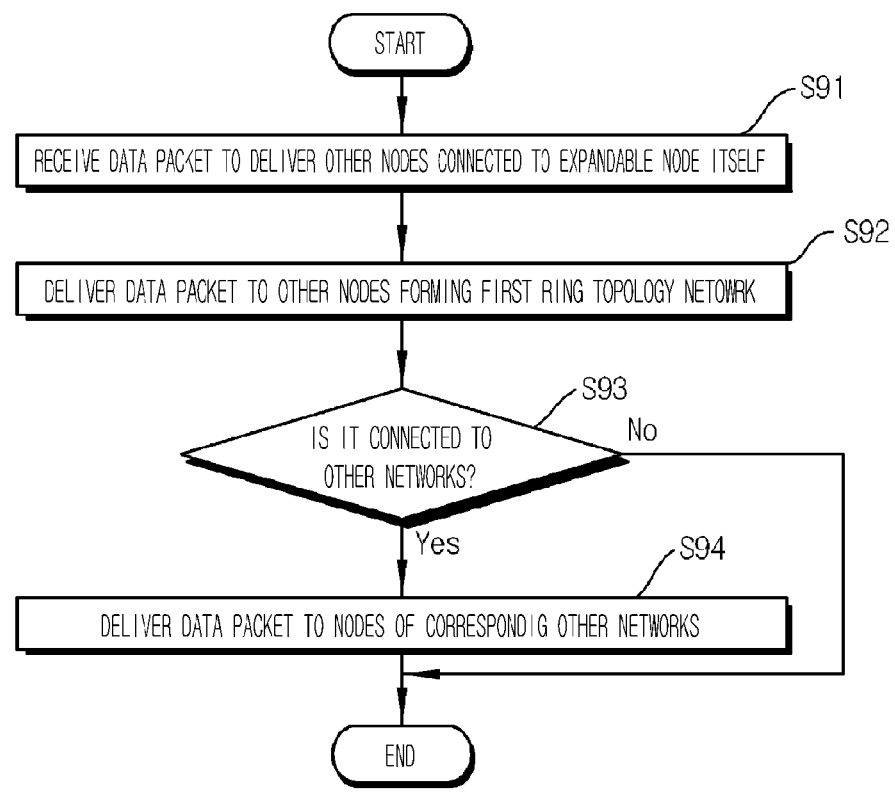

EXPANDABLE ETHERNET RING TOPOLOGY NETWORK AND COMMUNICATION METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2012-0123326, filed on Nov. 2, 2012, the contents of which is incorporated by reference herein in its entirety.

BACKGROUND

The present disclosure relates to a ring-type network connected through an Ethernet port, and more particularly, enables the ring-type network to be linked to other networks having various topologies while maintaining an original ring structure.

Recently, expandability has come to the fore as an important element in an industrial network due to a highly industrialized society, massive information, and high complexity, and the industrial network needs to support topologies having various shapes so as to integrate and manage distributed sites.

In particular, a ring topology network holds a place as an important axis in the industrial network so that international protocol (such as IEC 62439) establishes a protocol for a ring topology based industrial network.

The ring topology network has an advantage in that the reliability of a network may be secured because even if an intermediate node has an error, the ring topology network may communicate through other paths.

In general, industrial sites enhance network performance by connecting several communication devices (nodes) having two Ethernet ports through Ethernet to form a ring topology network.

FIG. 1 shows a node 10 having two Ethernet ports. Port #1 and port #2 are used for configuring a ring topology network.

FIG. 2 shows an example of a ring topology network using several nodes having two Ethernet ports. A second port P11 of node #11 and a first port P12 of node #12, a second port P13 of node #12 and a first port P14 of node #13, a second port p15 of node #13 and a first port P16 of node #14, a second port P17 of node #14 and a first port P18 of node #15, and a second port P19 of node #15 and a first port P20 of node #11 are sequentially connected to form a ring topology network.

However, such a typical method of configuring a ring topology network has a drawback in that the expandability of a network decreases because the method is just interested in connecting nodes in a ring shape.

For example, since the number of Ethernet ports of a node that supports a ring topology network is limited to two, it is difficult to configure networks in various shapes.

Moreover, once a ring topology network is configured, linking to a network other than a corresponding ring topology network is not considered and it is difficult to integrate and manage several networks previously built as a single network.

SUMMARY

Embodiments provide an expandable Ethernet ring topology network in which a ring topology network is connected to other networks while maintaining its shape and thus may flexibly expand, integrate, and manage a ring topology network system.

Thus, an expandable Ethernet ring network according to embodiments includes a first ring topology network in which a plurality of nodes are connected in a ring shape through Ethernet ports, one or more of nodes of the first ring topology network include expandable nodes (each have three or more Ethernet ports), and Ethernet ports not used for forming the first ring topology network among the Ethernet ports of the expandable node are connected to other networks.

The expandable node forming the first ring topology network may be connected to nodes of other networks that are linear.

The expandable node forming the first ring topology network may be connected to another ring topology network.

One Ethernet port that is not used for forming the first ring topology network among the Ethernet ports of the expandable nodes forming the first ring topology network may be connected to one Ethernet port that is not used for forming the another ring topology network among the Ethernet ports of the expandable nodes forming the another ring topology network.

When the number of the Ethernet ports of the expandable node may be four or larger, two of the Ethernet ports of the expandable forming the first ring topology network may be used for forming the first ring topology network, and the other two of the Ethernet ports of a corresponding expandable node may be used for forming the another ring topology network.

The details of one or more embodiments are set forth in the accompanying drawings and the description below. Other features will be apparent from the description and drawings, and from the claims.

BRIEF DESCRIPTION OF THE DRAWINGS

FIG. 9 is an example for explaining the operation of an expandable node.

DETAILED DESCRIPTION OF THE EMBODIMENTS

Exemplary embodiments will be described below in detail with reference to the accompanying drawings.

Figure 1:
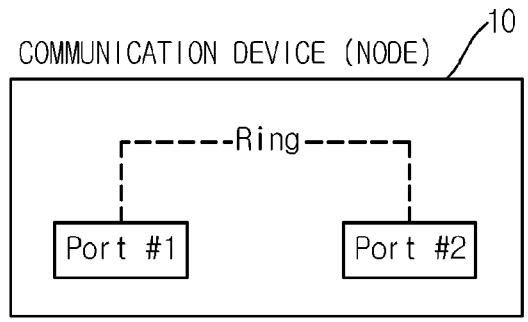
FIG. 1 is an example of a node having two Ethernet ports.
Figure 2:
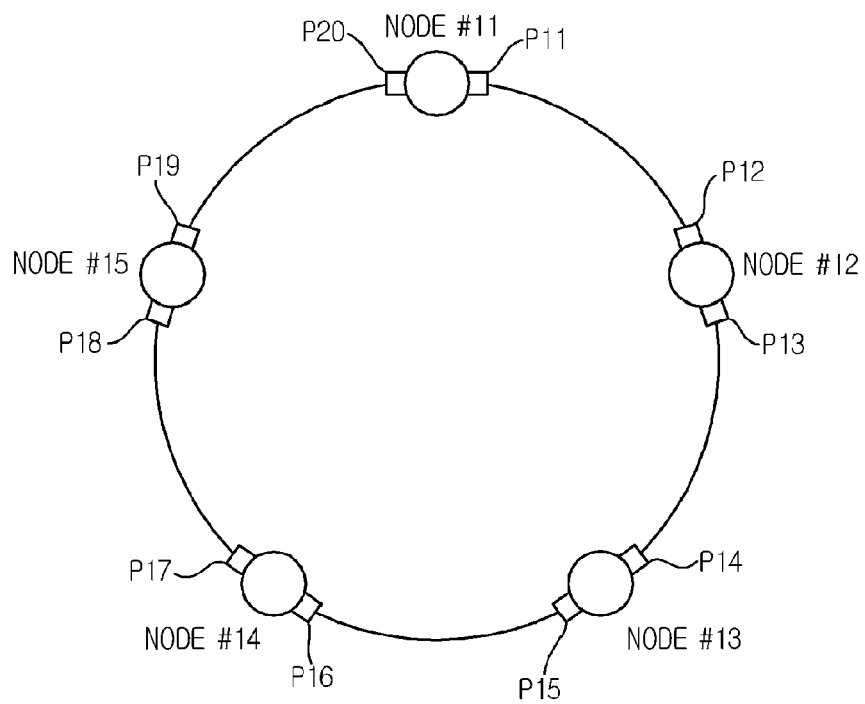
FIG. 2 is an example of an Ethernet ring topology network.
Figure 3:
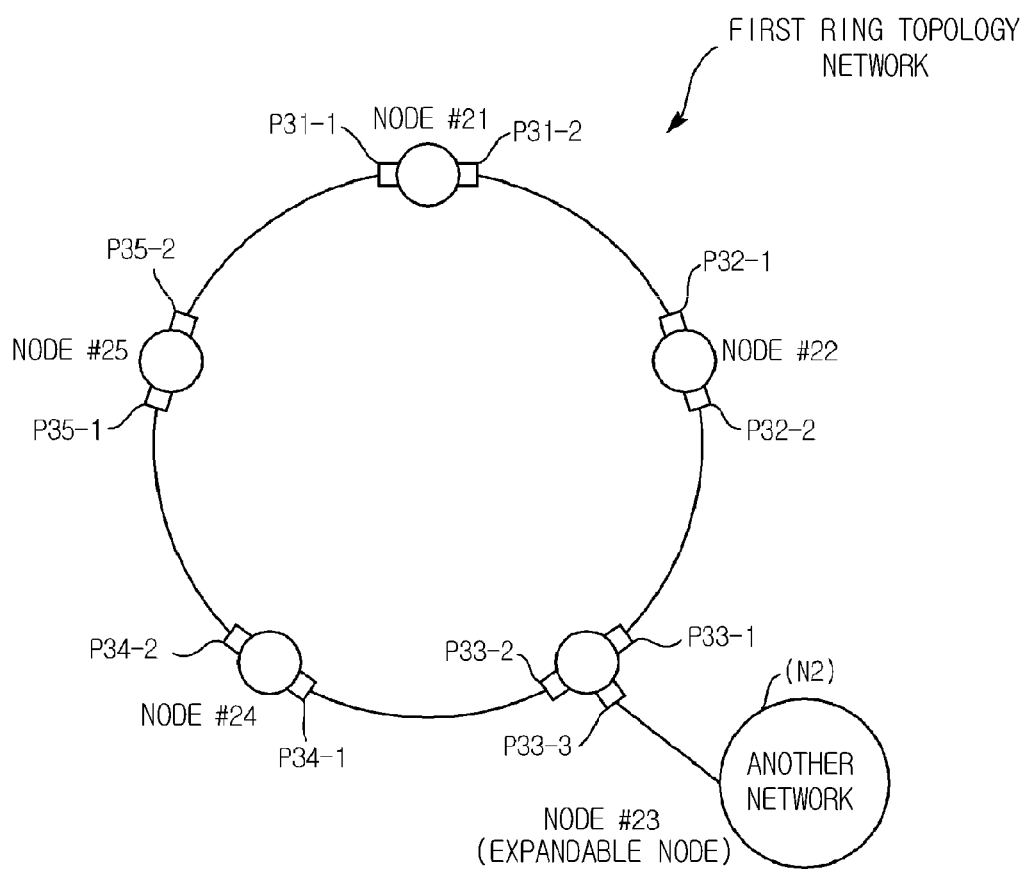
FIG. 3 is an embodiment of an expandable Ethernet ring network.

Referring to FIG. 3, an expandable Ethernet ring network according to an embodiment fundamentally includes a network in which a plurality of nodes is arranged in a ring shape (N1, referred to as a first ring topology network).

The node indicates a communication device that includes a certain number of Ethernet ports and enables Ethernet communication. Each node may be configured in various ways as needed, takes parts in configuring a network and delivers a communication frame to an adjacent node that is connected to the node itself.

In FIG. 3, the first ring topology network N1 forms a ring topology network in which a second port P31-2 of node #21 and a first port P32-1 of node #22, a second port P32-2 of node #22 and a first port P33-1 of node #23, a second port P32-2 of node #23 and a first port P34-1 of node #24, a second port P34-2 of node #24 and a first port P35-1 of node #25, and a second port P35-2 of node #25 and a first port P31-1 of node #21 are sequentially connected.

Although the example includes five nodes for the convenience of description, the number of nodes that configure the ring topology network may vary.

In particular, one or more of nodes that configure the first ring topology network N1 need to be expandable nodes and the first ring topology network N1 may be connected to another network N2 through an expandable node.

The expandable node indicates a node that includes three or more Ethernet ports and node #23 in the first ring topology network N1 of FIG. 3 is an expandable node.

General nodes (node #21, node #22, node #24 and node #25) other than the expandable nodes may include only two Ethernet ports so as to form a ring topology network.

Two of the Ethernet ports P33-1 and P33-2 of node #23 are used for forming the first ring topology network N1 and the Ethernet port P33-3 that is not used for forming the first ring topology network N1 is used as a port connected to another network N2.

That is, the first ring topology network N1 is connected to another network N2 through an expandable node. Although FIG. 3 shows that the first ring topology network N1 is connected to another network N2 through the third port P33-3 of the node #23 that is an expandable node, a way of connecting to another network N2 may vary depending on the number of Ethernet ports of an expandable node and another network N2 that is connected to the first ring topology network N1 may also have various shapes.

Figure 4:
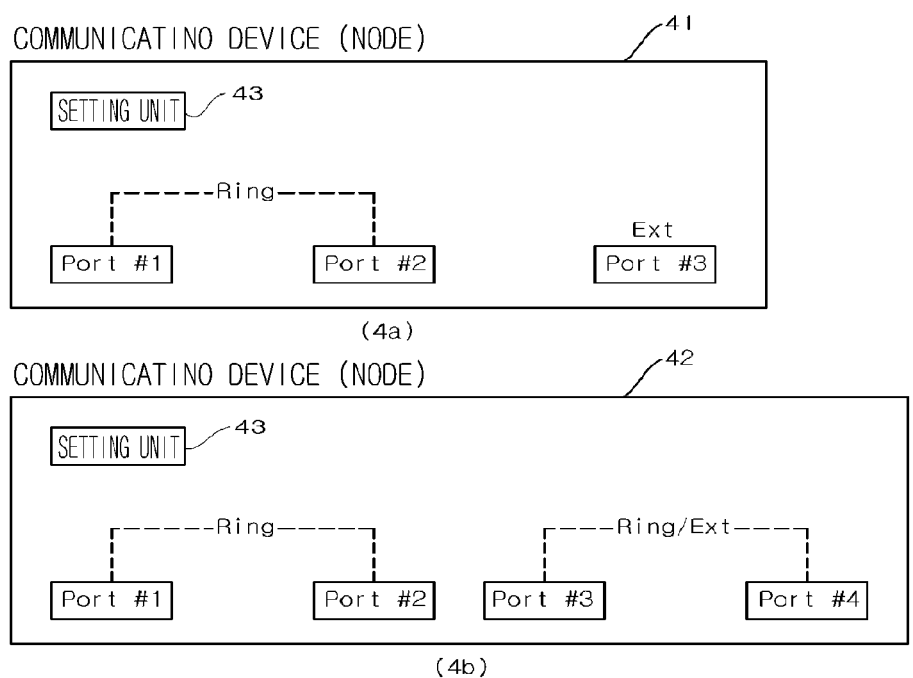
FIG. 4 is an example of a node having three or more Ethernet ports.

FIG. 4A shows an example of an expandable node 41 having three Ethernet ports, a first port port #1 and a second port port #2 may be used for configuring the first ring topology network N1 and a third port port #3 may be used for connecting to another network.

FIG. 4B shows an example of an expandable node 42 having four Ethernet ports, a first port port #1 and an second port port #2 of the four Ethernet ports may be used for configuring the first ring topology network N1 and a third port port #3 and a fourth port port #4 may be used for connecting to another network.

A way of connecting the first ring topology network N1 to another network N2 may be numerous. For example, it is possible to simply the expandable node of the first ring topology network N1 to the node of another network N2 or a configuration may be made so that the expandable node of the first ring topology network N1 takes part in forming another ring topology network.

The way of connecting the first ring topology network N1 to another network N2 may be fixed but may be configurable.

Regarding this, each of the expandable nodes 41 and 42 may include a setting unit 43 that enables the way of connecting to another network N2 to be configurable.

The setting unit 43 may be configured in various types, for example, as a switch. In this case, by setting the switch, a user may determine whether to use the port #3 and the port #4 for the formation of another ring topology network or whether to use them to simply connect to a node of another network N2.

Embodiments of networks of various shapes that may be configured according to the present invention will now be described.

Figure 5:
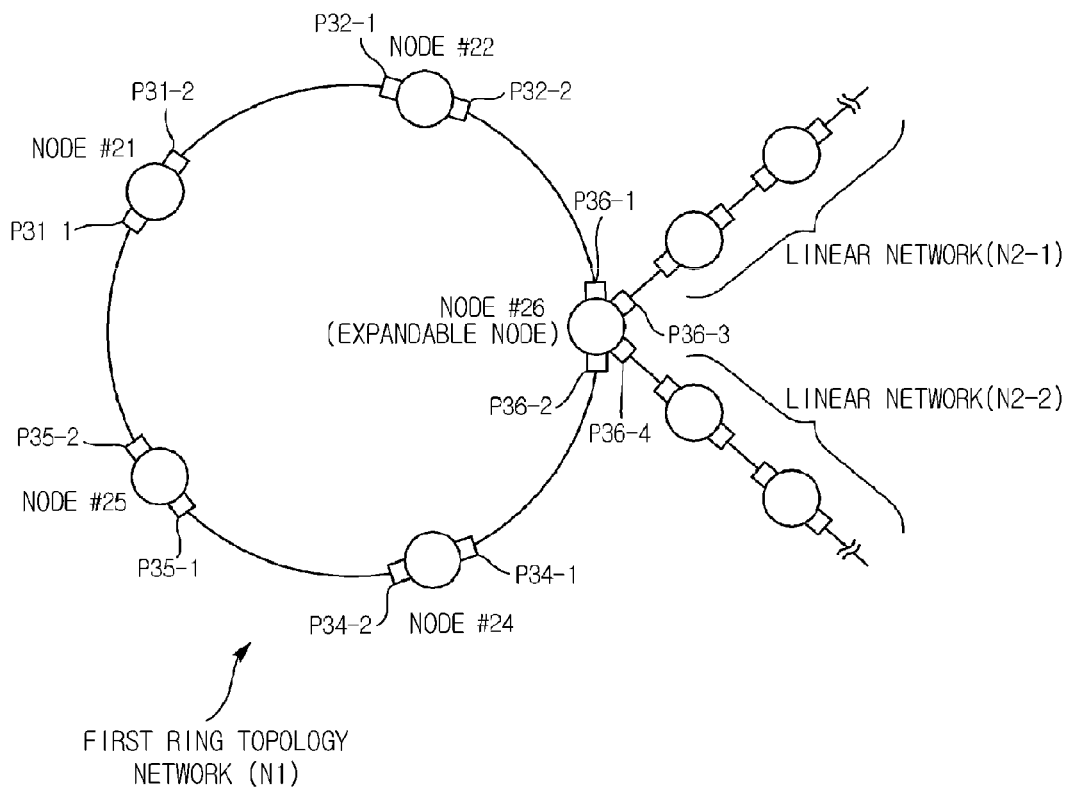
FIG. 5 is an embodiment where a ring topology network is connected to a linear network.

Referring to FIG. 5, an expandable node of the first ring topology network N1 may be connected to other networks N2-1 and N2-2 that are connected in a daisy chain manner.

Node #26 of nodes of the first ring topology network N1 is an expandable node, has four Ethernet ports P36-1 to P36-4, and forms the firs ring topology network N1 through first and second ports P36-1 and P36-2.

Moreover, a third port P36-3 that is an Ethernet port connected to other networks is connected to a linear network N2-1 and a fourth port P36-4 is connected to another linear network N2-2.

If an expandable node forming the first ring topology network N1 has three Ethernet ports, it may be connected to a linear network.

On the other hand, an expandable node forming the first ring topology network N1 may also be connected to another ring topology network.

Figure 6:
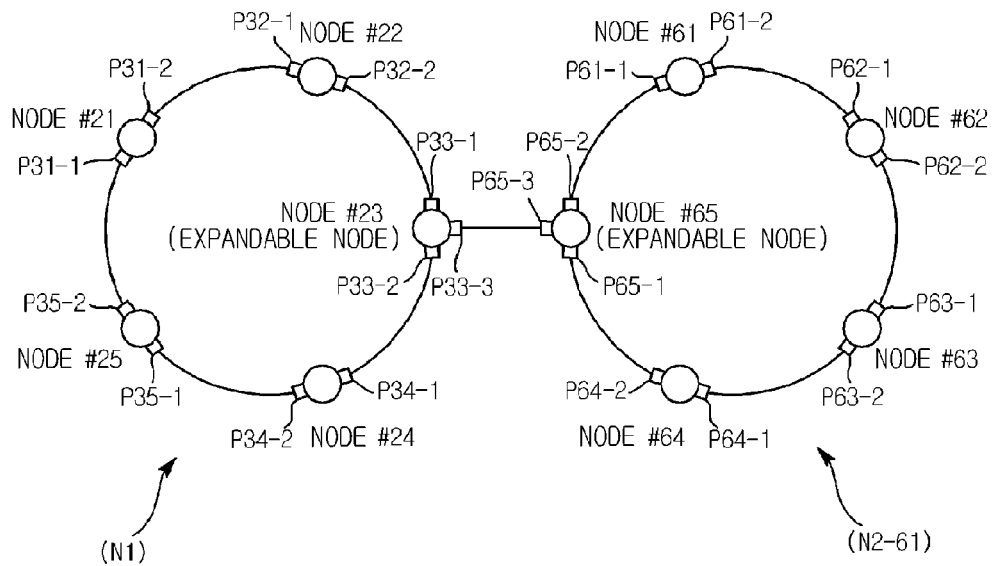
FIG. 6 is an embodiment where different ring topology networks are connected to each other.

FIG. 6 is an example where the first ring topology network N1 is connected to another ring topology network N2-61 through the Ethernet port P33-3 that is not used for the formation of the first ring topology network N1 among the Ethernet ports of the expandable node #23 that forms the first ring topology network N1.

Another ring topology network N2-61 forms a ring topology network in which a second port P61-2 of node #61 and a first port P62-1 of node #62, a second port P62-2 of node #62 and a first port P63-1 of node #63, a second port P63-2 of node #63 and a first port P64-1 of node #64, a second port P64-2 of node #64 and a first port P65-1 of node #65, and a second port P65-2 of node #65 and a first port P61-1 of node #61 are sequentially connected.

At another ring topology network N2-61, an expandable node is node #65, and the third port P33-3 of the node #23 forming the first ring topology network N1 is connected to the Ethernet port P65-3 that is not used for the formation of the ring topology network among the Ethernet ports of the expandable node #65 that forms another ring topology network N2-61.

In this case, what is needed is that each of an expandable node forming the first ring topology network N1 and an expandable node forming another ring topology network N2-61 has three or more Ethernet ports.

Figure 7:
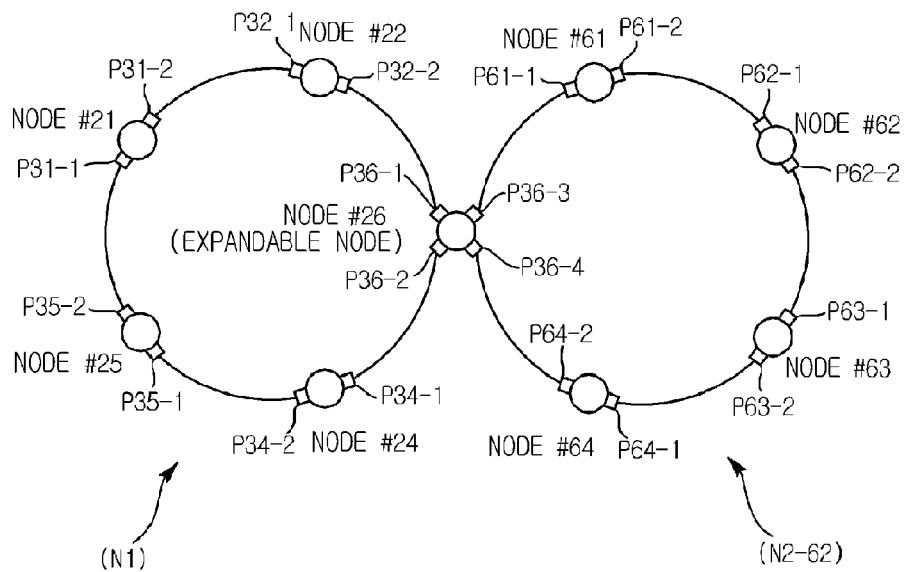
FIG. 7 is another embodiment where different ring topology networks are connected to each other.

Referring to FIG. 7, two of the Ethernet ports of the expandable node forming the first ring topology network N1 may be used for the formation of the first ring topology network N1 and the other two of the Ethernet ports of a corresponding expandable node may be used for the formation of another ring topology network N2-62.

That is, the first port P36-1 and the second port P36-2 among the Ethernet ports of the node #26 that is the expandable node of the first ring topology network N1 are being used to form the first ring topology network N1 and the third port P36-3 and the fourth port P36-4 are being used to form another ring topology network N2-62.

As such, two ring topology networks through one expandable node may be formed and in this case, the number of the Ethernet ports of the expandable needs to be four or larger.

Figure 8:
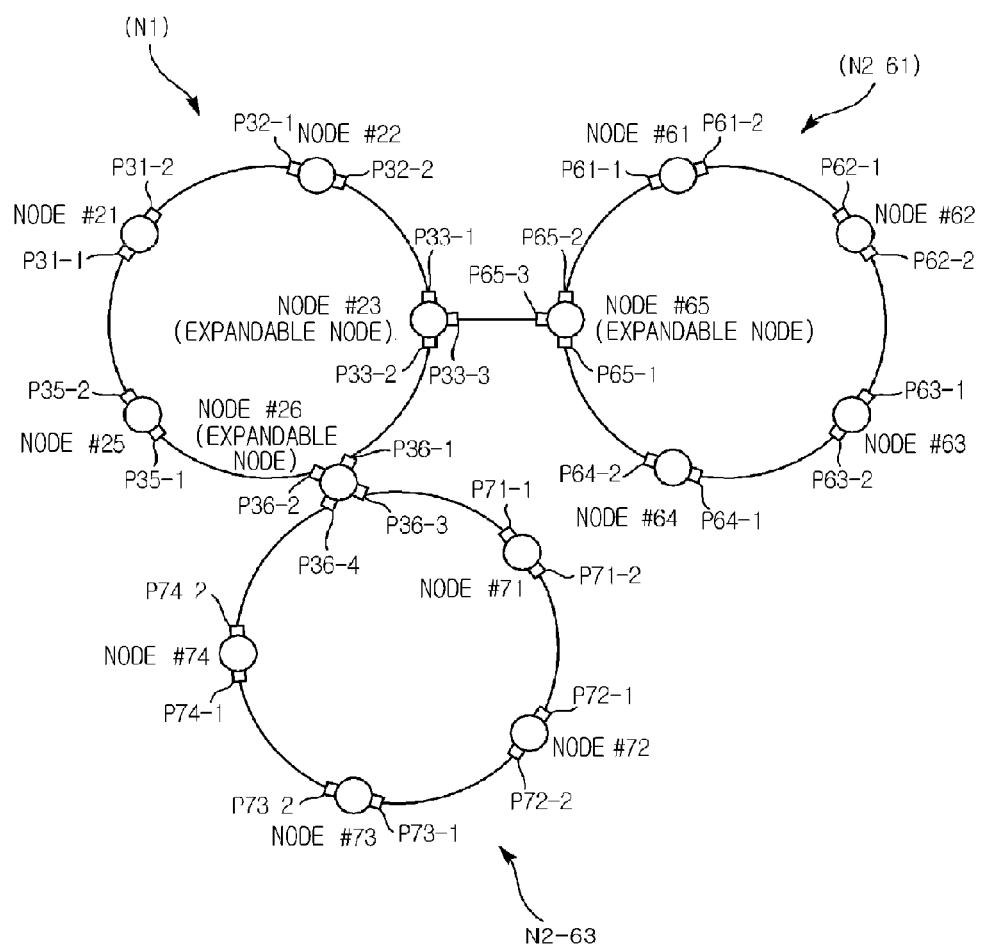
FIG. 8 is an embodiment where three or more ring topology networks are connected.

FIG. 8 shows an embodiment where two different ring topology networks N2-61 and N2-63 are connected to the first ring topology network N1 and the first ring topology network N1 includes two expandable node #23 and node #26.

The ring topology network N2-61 includes node #61, node #62, node #63, node #64, and node #65, and the third port P65-3 that does not take part in forming the ring topology network among the Ethernet ports of the node #65 being an expandable node is connected to the third port P33-3 of the node #23 that is an expandable node of the first ring topology network N1.

The ring topology network N2-63 forms a ring topology network in which a second port P71-2 of node #71 and a first port P72-1 of node #72, a second port P72-2 of node #72 and a first port P73-1 of node #73, a second port P73-2 of node #73 and a first port P74-1 of node #74, a second port P74-2 of node #74 and a fourth port (P36-4) of node #26, and a third port of node #26 and a first port P71-1 of node #71 are sequentially connected.

Since an expandable node of the ring topology network N2-61 is connected to the first ring topology network N1 through a single port P65-3, what is needed is that a corresponding expandable node #23 of the first ring topology network N1 has three Ethernet ports.

However, since the ring topology network N2-63 configures a ring through the expandable node node #26 of the first ring topology network N1, the node #26 of the first ring topology network N1 needs to have at least four Ethernet ports. That is, the first port P36-1 and the second port P36-2 of the node #26 forms the first ring topology network N1 and the third port P36-3 and the fourth port P36-2 forms the ring topology network N2-63.

When connecting several ring networks, a path for an expandable node may not form a loop.

FIG. 9 shows an example of a process of processing the communication of an expandable node forming a first ring topology network and if a data packet to be delivered to another node is received in step S91, the extendable node delivers a corresponding data packet to a node adjacent to the expandable node itself that forms the first ring topology network, in step S92.

Moreover, the expandable node checks whether the expandable node itself is also connected to another network other than the first ring topology network, in step S93, and delivers the data packet to a corresponding node if positive, in step S94.

In the specification, the first ring topology network indicates a term that is defined to describe any ring topology network.

Therefore, all ring topology networks may be understood to be the first ring topology network in relation to other networks and a network may be configured so that three or more networks are successively connected.

Moreover, each ring topology network may include two or more expandable nodes and there is no constraint on topologies of other networks connected through the expandable nodes. Thus, networks according to the embodiments may be configured in various manners as needed as long as the networks include at least one ring topology network.

According to the embodiments, it is possible to add equipment even without changing the ring topology network previously built. Since the ring topology network may communicate with other networks of various topologies, it is possible to integrate and manage several networks into a single network.

The above-described embodiments are intended to help readers to understand the present invention and the present invention is not limited the above-described embodiments and various variations may be made by an ordinary person skilled in the art without departing from the technical spirit of the present invention.

What is claimed is:

1. An expandable Ethernet ring network comprising:
   a plurality of nodes connected in a ring shape through Ethernet ports to form a first ring topology network, the first ring topology network includes one or more expandable nodes, each of which includes three or more Ethernet ports;
   wherein the expandable node further comprises a setting unit for setting a way of connecting the first ring topology network to other networks,
   wherein the setting unit, in accordance with a first user setting of a switch of the setting unit, connects a first Ethernet port and a second Ethernet port of the expandable node to respective Ethernet ports of nodes of another ring topology network, and
   wherein the setting unit, in accordance with a second user setting of the switch of the setting unit, connects the first Ethernet port of the expandable node to an Ethernet port of a node of a first linear topology network and connect the second Ethernet port of the expandable node to an Ethernet port of a node of a second linear topology network.

2. The expandable Ethernet ring network according to claim 1, wherein one Ethernet port that is not used for forming the first ring topology network among the Ethernet ports of the expandable nodes forming the first ring topology network is connected to one Ethernet port that is not used for forming the another ring topology network among the Ethernet ports of the expandable nodes forming the another ring topology network.

3. The expandable Ethernet ring network according to claim 1, wherein the number of the Ethernet ports of the expandable node is four or larger, and
   two of the Ethernet ports of the expandable node are used for forming the first ring topology network.

4. A communication method of an expandable Ethernet ring network, the method comprising:
   forming a first ring topology network in which a plurality of nodes are connected in a ring shape through Ethernet ports;
   receiving, by one or more expandable nodes in the first ring topology network, a data packet to be delivered to another node, wherein the expandable node is a node that has three or more Ethernet ports;
   connecting a first Ethernet port and a second Ethernet port of the expandable node to respective Ethernet ports of nodes of another ring topology network in accordance with a first user setting of a switch of the setting unit,
   connecting the first Ethernet port of the expandable node to an Ethernet port of a node of a first linear topology network and connecting the second Ethernet port of the expandable node to an Ethernet port of a node of a second linear topology network in accordance with a second user setting of the switch of the setting unit.

5. The method according to claim 4, wherein one Ethernet port that is not used for forming the first ring topology network among the Ethernet ports of the expandable nodes forming the first ring topology network is connected to one Ethernet port that is not used for forming the another ring topology network among the Ethernet ports of the expandable nodes forming the another ring topology network.

6. The method according to claim 5, wherein the number of the Ethernet ports of the expandable node is four or larger, and
   two of the Ethernet ports of the expandable node forming the first ring topology network are used for forming the first ring topology network.

\* \* \* \* \*